United States Patent [19]

Kimura

[11] Patent Number: 4,770,907

[45] Date of Patent: Sep. 13, 1988

[54] METHOD FOR FORMING METAL-COATED ABRASIVE GRAIN GRANULES

[75] Inventor: Koichi Kimura, Hyogo, Japan

[73] Assignee: Fuji Paudal Kabushiki Kaisha, Osaka, Japan

[21] Appl. No.: 106,117

[22] Filed: Oct. 17, 1987

[51] Int. Cl.[4] .............................................. B32B 7/02
[52] U.S. Cl. ...................................... 427/217; 51/307; 419/35; 419/36; 419/37
[58] Field of Search ...................... 427/217; 419/35, 36, 419/37; 51/307

[56] References Cited

U.S. PATENT DOCUMENTS

| | | | |
|---|---|---|---|
| 4,200,680 | 4/1980 | Sasazawa et al. | 427/217 |
| 4,291,089 | 9/1987 | Adamovic | 427/217 |
| 4,374,173 | 2/1983 | Adamovic | 427/217 |
| 4,421,799 | 12/1983 | Novinski | 427/217 |
| 4,596,691 | 6/1986 | Ruppert et al. | 419/36 |
| 4,617,054 | 10/1986 | Mathers | 419/36 |

Primary Examiner—Stephen J. Lechert, Jr.
Attorney, Agent, or Firm—Shefte, Pinckney & Sawyer

[57] ABSTRACT

A method of producing metal-coated abrasive grain granules suitable for the manufacture of metal bonded diamond tools, by the steps of initially preparing a slurry of metal powder with a solution of an agglomerating binder dissolved in an organic solvent, agitating the slurry to homogenously suspend the metal powder therein, and spraying the slurry using an atomizing nozzle into a fluidized suspension of abrasive grains within a fluid bed granulator to progressively build and dry a uniform spherical coating of the slurry on each individual abrasive grain.

18 Claims, 2 Drawing Sheets

METHOD FOR FORMING METAL-COATED ABRASIVE GRAIN GRANULES

BACKGROUND OF THE INVENTION

The present invention relates generally to methods of forming granules by coating a grain-like core with a powder material utilizing a liquid binder and, more particularly, to such methods wherein diamond, synthetic diamond or cubic boron nitride grains are coated with a metal powder for use in press-molding operations such as in the manufacture of metal-bonded diamond tools.

As is known, many high technology cutting and abrading tools are conventionally fabricated of a suitable metal with minute grains of diamond, synthetic diamond or cubic boron nitride generally uniformly embedded in the metal within the cutting or abrading components of the tools. Basically, such tool components are formed by conventional powder metalurgical techniques wherein the abrasive grain material is initially mixed with a powdered metal or combination of metals, after which the mixture is utilized in a conventional press-molding operation to bond and shape the mixture into the desired tool component. As desired, sintering heat may be applied as part of the pressing operation or, alternatively, the press-molded component may be subjected to a subsequent sintering procedure. Within the relevant industry, tools fabricated in this manner are commonly referred to as metal bonded diamond tools.

Conventionally, the composition of such metal bonded diamond tools is identified according to four parameters: (a) the type of abrasive grain material utilized, (b) the grain size of the abrasive material expressed in terms of the range of standardized U.S. screen mesh sizes through which the grains will pass, (c) the concentration of the abrasive grains as a proportion of the total volume of the grain/metal conglomerate with a 100 concentration designating a total grain weight of 4.4 carats per cubic centimeter of conglomerate, and (d) the grade of the abrasive grain/metal conglomerate representing the relative hardness thereof which derives from the grain retaining strength of the metal-to-grain bond. Whereas the abrasive type, grit size and concentration are measurable objective parameters which thereby have become standardized within the industry, the grade of metal-bonded diamond tools is a more subjective designation which depends in large part on the manufacturing know-how and skill of the tool maker. As will be understood, however, one of the most critical factors in determining the grade of a metal-bonded diamond tool is the degree of homogenous distribution of the abrasive grains within the grain/metal conglomerate, which directly affects the performance and life of the tool.

According to one conventional process of manufacturing metal bonded diamond tools, pre-weighed quantities of the abrasive grain and powdered metal raw materials in appropriate proportions to provide the desired concentration are initially mixed in batch form in a suitable mixing apparatus, following which the batch mixture is manually fed in individual weighed charges into each die cavity of the pressing apparatus for performance of the press-molding operation. As will be apparent, this process suffers the disadvantages of being highly labor intensive and, further, being extremely dependent on the particular skill of the technician performing the process, which often results in inconsistent quality and grade. Additionally, the process of feeding the mixture into the die cavities cannot be automated due to the poor flowability of metal powder and the tendency of the abrasive grains to segregate from the metal powder during any automated feeding operation.

In an alternative conventional method, the metal powder is initially processed with an agglomerating binder solution in a suitable granulating apparatus to convert the metal powder into a granular form having improved flowability. The granules and the abrasive grains are then weighed and mixed in predetermined proportions as in the first-described process, preparatory to the press-molding operation. According to this method, the mixture of the metal granules and abrasive grains may be fed automatically into the die cavities of the pressing apparatus, as a result of the enhanced flowability provided by the granular form of the metal powder. However, the metal granules typically vary considerably more in size than the abrasive grains and, in any event, differ in density from the abrasive grains. Disadvantageously, these differences in physical properties tend to produce segregation of the metal granules and the abrasive grains during mixing, particularly in any automated feeding operation, and, further, result in an uneven distribution of the abrasive grains in the tool component ultimately produced, which deleteriously affects the grade of the tool component.

In attempting to solve the problems of the foregoing methods, it has been proposed to preliminarily form the abrasive grain and metal powder raw materials into composite granules by using an agglomerating binder to coat the abrasive grains with the metal powder. According to one such method in conventional use, a pre-weighed batch of abrasive grains is charged into a suitable granulating apparatus, such as a conventional tumbling-type granulator, with pre-measured quantities of the metal powder and binder then being fed alternately or simultaneously through separate charge ports into the granulator during its tumbling operation to progressively build a metal powder coating on the abrasive grains. The desired grain concentration is achieved either by continuing the granulating process until all metal powder is coated onto the abrasive grains or by sieving the metal-coated granules to a predetermined granule diameter range calculated theoretically on the assumption that each granule contains a single abrasive grain. In practice, however, it has been found that only a relatively small percentage of the granules produced in fact contain only a single abrasive grain, many of the granules either having no abrasive grain or containing multiple grains. This disadvantageous result occurs because the binder tends to cause the metal powder not only to adhere to the abrasive grains but also to agglomerate to itself while, at the same time, the granulating apparatus does not achieve optimal dispersion of the abrasive grains within the granulating chamber so that at least some of the grains tend to segregate and therefore several grains may be bound into a single granule. As a net ultimate result, the abrasive grains are thereby segregated and unevenly distributed within the tool component produced from the granules, which of course negatively affects the grade of the tool component. Furthermore, the interior surfaces and component parts of the granulating apparatus which come into contact with the abrasive grains during the granulating process are subjected to severe wear, which significantly limits their useful life and thereby increases the cost of the granulating operation.

It is also known in the relevant industry to apply a coating of single or multiple layers of thin metal film on abrasive grains by eletro-plating, chemical plating or vacuum deposition of the metal film on the abrasive grains. Representative examples of such processes are disclosed in South African patent application Nos. 70/3466, filed May 22, 1970, and 70/3653, filed May 29, 1970, each in the name of DeBeers Industrial Diamond Division, Ltd. In such processes, the grain retaining strength of the metal-to-grain bond is improved by taking advantage of the chemical reaction between the diamond grain surface and the metal layer achieved at a sintering temperature.

SUMMARY OF THE INVENTION

It is an object of the present invention to provide an improved method of agglomerating binder-type formation of metal-coated abrasive grain granules which consistently produces granules of uniform spherical size and density with a high proporiton of granules having only a single abrasive grain for achieving significantly improved grain retaining strength and grade in tool components and the like produced from the granules.

Briefly summarized, the method of the present invention basically involves the steps of initially preparing a slurry of a selected metal powder with a binding agent dissolved in an organic solvent in predetermined relative concentrations, fluidizing a quantity of selected abrasive grain cores in a work vessel, and spraying the slurry into a work vessel onto the abrasive grain cores during fluidization thereof for building and drying a generally uniform coating of the slurry on each abrasive grain core.

Preferably, the work vessel is a fluidized bed granulating apparatus of the type having a material work area, a rotatable perforated plate disposed immediately beneath the work area and means for conveying a gaseous fluid through the work area for fluidized circulation of charge material therewithin, the granulating apparatus being operated to generally individually fluidize the abrasive grain cores within the work area. A two-fluid atomizing nozzle is utilized for spraying the slurry into the granulating apparatus with the assistance of a compressed gas to atomize the slurry.

The abrasive grain cores are diamond, synthetic diamond, or cubic boron nitride grains of a generally uniform mesh size, within the range of approximately 200 U.S. Mesh to 8 U.S. Mesh. The metal powder may be cobalt, copper, iron, bronze, tungsten carbide, or a mixture of two or more thereof, and should be of a generally uniform particulate size preferably within the range of approximately 0.5 to 20 micrometers. Polyethylene glycol, liquid paraffin, or glycerol are preferred as the binding agent, and ethyl alcohol or trichloro-ethylene are preferred as the organic solvent. The metal powder should comprise no greater than approximately 50% by weight of the slurry and the binder should comprise no greater than approximately 3% of the weight of the metal powder.

In the preferred embodiment of the present method, the spraying of the slurry is continued for a sufficient time to build the coating on each abrasive grain core to achieve a total weight of the granules approximating a weight value representing the desired granule concentration. The average diametric dimension of each coated granule may range up to, but no greater than, approximately six times the diametric dimension of the abrasive grain core, depending upon the desired concentration. The perforated plate of the fluidized bed granulating apparatus is rotated throughout the course of the granulating operation to circulate the abrasive grain cores within the material work area during fluidization of the cores. The slurry is at least intermittently agitated to suspend the metal powder generally uniformly therein.

DESCRIPTION OF THE PREFERRED EMBODIMENT

Figure 1:
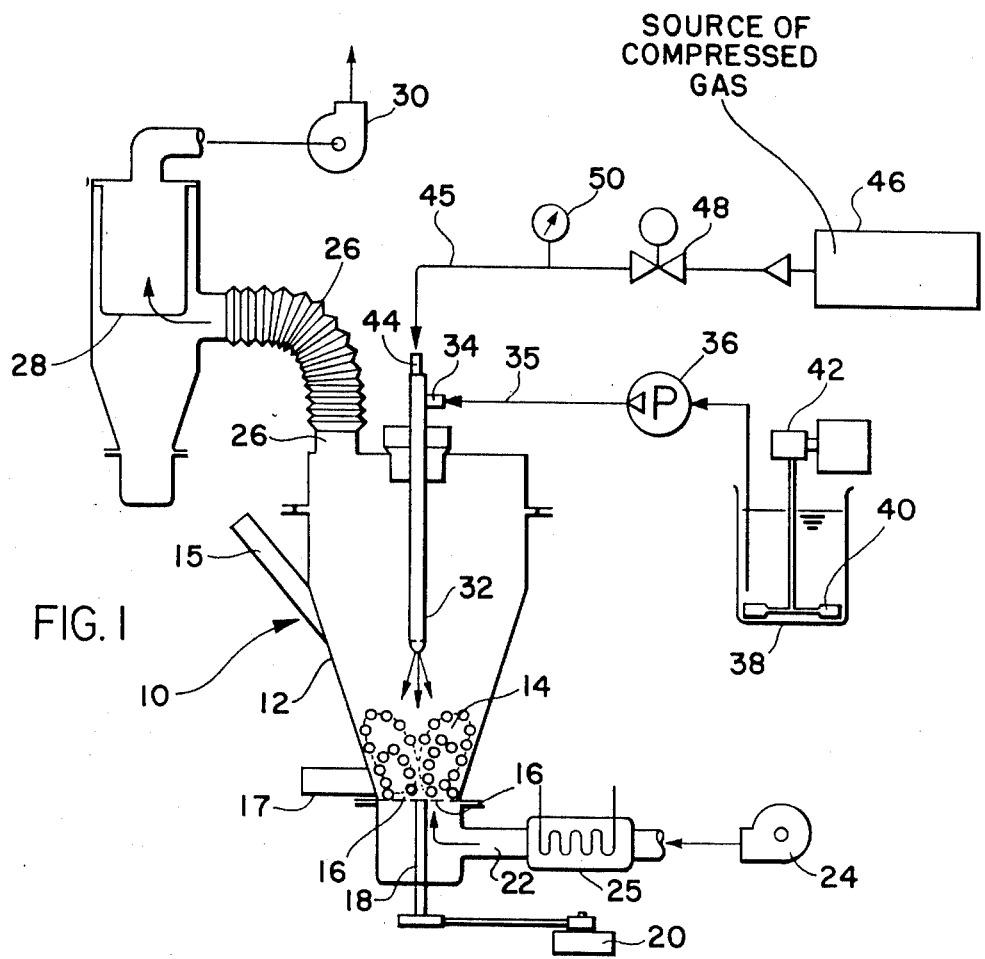
FIG. 1 is a schematic view illustrating a representative apparatus for carrying out the preferred manner of performing the method of the present invention.

With reference initially to FIG. 1, there is schematically illustrated a representative granulating apparatus suitably constructed and arranged for the preferred performance of the method of the present invention. The granulating apparatus utilizes a fluidized bed granulator, generally indicated at 10, of the essentially conventional type having a substantially circular upright hollow vessel 12 defining a granulation and coating work area 14 therewithin, with a perforated circular plate 16 rotatably mounted within the lower region of the vessel 12 immediately below the work area 14 on a vertical shaft 18 rotatably belt-driven from a suitable electric motor 20. The vessel 12 includes a selectively openable and closeable material inlet chute 15 which opens to the interior of the vessel 12 for supplying charge material to the work area 14, and a selectively openable and closeable product outlet chute 17 which opens into the interior of the vessel 12 at the lowermost region of the work area 14 for discharging granular product produced in the vessel 12. A duct 22 opens into the vessel 12 below the perforated plate 16 and communicates with the outlet side of a blower 24, or other suitable source of air or gaseous suspension fluid, for directing the fluid upwardly through the perforated plate 16 and through the work area 14. A flexible duct 26 opens into the upper region of the vessel 12 through its top wall and extends therefrom to a conventional bag filter apparatus, generally indicated at 18, which in turn communicates with the inlet side of another blower 30, for exhausting from the vessel 12 the fluid directed thereinto by the blower 24. As desired, a heat exchanger 25 may be provided in the inlet duct 22 for heating and/or dehumidifying the fluid delivered from the blower 24.

In contrast to more conventional fluidized bed granulating apparatus, the granulator 10 is preferably of a relatively small size adapted for processing relatively small batches of the expensive abrasive grain material for which the present method is particularly conceived. Preferably, the work area 14 of the vessel 12 is of a volumetric capacity and the inlet and outlet blowers 24,30 are of sufficient fluidizing capacity, for granulating operation on an initial charge of abrasive grain material of between 50 and 100 grams.

According to the present invention, a conventional two-fluid atomizing nozzle 32 is mounted centrally within the interior of the vessel 12 immediately above the work area 14. One fluid inlet 34 to the nozzle 32 communicates through a suitable conduit 35 with the outlet side of a fluid pump 36, the inlet side of which communicates with the interior of a fluid container 38. The pump 36 preferably is of a simple conventional construction, such as a roller-tube pump or a diaphragm pump. A bladed agitator 40 is rotatably supported in the fluid container 38 on the drive shaft of an operating motor 42. The other inlet 44 to the nozzle 34 communicates through a suitable conduit 45 with a source of compressed gas, representatively indicated at 46. A pressure regulating device 48 and a pressure gauge 50 are associated with the conduit 45 for regulating and monitoring the flow of compressed gas to the inlet 44.

According to the present method, a slurry of a suitable metal powder with an agglomerating binder dissolved in an organic solvent is initially prepared in the fluid container 38. As aforementioned, metal powders appropriate for the manufacture of metal bonded diamond tools, according to conventional practice, are cobalt, copper, iron, bronze, tungsten carbide, or a combination thereof, with cobalt generally being preferred. The binder should be of a suitable thermal decomposition type so as to facilitate burning out of the binder during sintering of the tool component ultimately fabricated. The solvent should be organic to prevent the metal powder from oxidizing during processing. In the present method, polyethylene glycol, liquid paraffin or glycerol may alternatively be employed as the binder, with ethyl alcohol or trichloro-ethylene being preferred as the organic solvent. Of course, any of various other organic solvents capable of dissolving the binder may be utilized, with the exception of water which may pose oxidation problems on the metal powder. The metal powder should be of a substantially uniform particle size preferably within the range of approximately 0.5 to 20 micrometers. The concentration of the metal powder in the slurry depends on the type of metal employed and its particle size, but preferably should be no greater than 50% by weight in order to minimize any possible risk that the slurry may clog the feeding conduit. As is known, excessive binder in metal-bonded abrasive grain granules may result in undesirable metal cracking and decreased mechanical strength in a sintered product manufactured from such granules. Accordingly, the quantity of binder utilized in the slurry should be minimized, the binder preferably constituting no greater than 3% of the total weight of the metal powder in the slurry. Rotational operation of the agitator 40 achieves complete dissolving and dispersion of the binding agent throughout the organic solvent and uniformly suspends the metal powder throughout the solution for complete wetting of each metal powder particle, the agitator 40 being operated at least intermittently and preferably continuously throughout the granulating operation to maintain homogeneity of the slurry and, particularly, to prevent any sedimentaiton of the metal powder particles within the container 38.

Once an appropriate slurry is prepared and readied within the container 38, the work area 14 of the fluid bed granulator vessel 12 is charged through its inlet chute 15 with a measured amount of abrasive grain material, preferably natural diamond, synthetic diamond or cubic boron nitride grains of a substantially uniform grit size, i.e. screen mesh size, which may range from approximately 200 U.S. Mesh (74 micrometers) to 8 U.S. Mesh (2380 micrometers). Concomitant with the aforementioned preferred volumetric capacity of the fluid bed granulator 10, the charge of abrasive grains will ordinarily be in the range of 50 to 100 grams.

Once the work area 14 is charged with the selected abrasive grains, the blowers 24 and 30 are actuated to provide a fluidizing flow of air or other suitable gaseous fluid upwardly through the perforated plate 16 and the work area 14 to provide a fluid bed supporting the abrasive grains substantially individually in a suspended fluidized state. Actuation of the motor 20 to simultaneously rotate the perforated plate 16 immediately beneath the work area 14 complimentarily serves to circulate the fluidized grains in a generally circular fashion annularly about the work area 14. However, as those persons skilled in the art will recognize, the method of the present invention may be equally well performed in a fluid bed granulating apparatus of the type having a fixed, rather than rotatable, perforated plate.

With the charge of abrasive grains thusly fluidized within the work area 14, the pump 36 is actuated and the pressure regulating valve 48 is opened to simultaneously deliver a continuous supply of the slurry from the container 38 and the compressed gas from its source 46 to the atomizing nozzle 32 to produce an atomized spray of the slurry onto the abrasive grains suspended and circulating within the work area 14. As will be understood, the atomized particles of the slurry, with the assistance of the binder therein, adhere to the abrasive grains within the work area 14 and progressively build a coating of the slurry on each grain. Due to the fluidized state of the grains and with the assistance of the annular circulation of the grains, the grains are maintained in a substantially individual state so that substantially every grain is individually coated. At the same time, the fluidizing air flow passing through the work area 14 assists in drying the atomized particles of slurry as they adhere to the abrasive grains, the heat exchanger 25 being selectively operable as desired to enhance and accelerate the drying process. Any portion of the atomized slurry which does not adhere to the suspended abrasive grains is carried out the vessel 12 by the fluidizing gas flow through the exit duct 26 and filtered and accumulated within the bag filter apparatus 28.

As will thus be understood, this process of coating the abrasive grains with the atomized slurry progressively builds the coated grains into composite granules of a substantially spherical shape, the coating and granulating process being continued for a sufficient time to build the slurry coating on the grains to a sufficient thickness to achieve a total weight of the granules substantially equaling a theoretical value, calculated according to industry standards, which provides the desired grain-to-metal concentration. In practice, the average granule diameter may range up to, but should not exceed, a total diameter approximately six times that of the average grain diameter of the abrasive grains. Thereupon, the blowers 24,30 and the slurry pump 36 are deactivated and the pressure regulating valve 48 is closed to stop the coating and granulating operation and the composite granules produced within the work area 14 are removed therefrom through the outlet chute 17 and are ready for use in any conventional press-molding or similar powder metal manufacturing operation for the production of components for metal-bonded diamond tools or any other tool, machine or apparatus requiring a relatively hard, abrasive and long wearing cutting or abrading surface. As will be understood by those persons skilled in the art, depending upon the amount of the initial abrasive grain charge to the granulating apparatus 10, the grit size of the grains and the thickness of the coating thereon required to achieve the desired grain-to-metal concentration, the granulating apparatus 10 may reach the maximum capacity of its work area 14 during the coating and granulating operation before all of the individual abrasive grains are fully coated to the desired thickness. In such instance, the coating and granulating operation is terminated once the maximum apparatus capacity is reached and the granules in process are discharged and sieved through a mesh screen of the appropriate mesh size for the desired size of finished granules, with the granules which have already reached or exceeded the desired size being removed. The undersized granules are recharged into the granulating apparatus for further coating and granulating operation. This procedure of coating, screening and re-processing of the granules is repeated until a total weight of the granules sufficient to achieve the required granule concentration is reached.

In an illustrative example of the present method as above-described, the slurry was prepared in the container 38 by dissolving 8 grams of glycerol as the agglomerating binder into 600 grams of ethyl alcohol as the organic solvent and then adding to the solution 400 grams of cobalt powder with a mean particle size of approximately 1 to 2 micrometers, thereby producing a slurry with approximately 40% concentration of metal powder and with the binder constituting 2% of the weight of the metal powder. Fifty grams of synthetic diamond abrasive grains of a grit size between 40 and 50 U.S. Mesh were charged into the vessel 12 of the fluid bed granulating apparatus 10. The blowers 24, 30 and the motor 20 to the perforated plate 16 were then each energized to fluidize the synthetic diamond grain charge and the heat exchanger 25 was set to control the temperature of the fluidized gas flow at essentially 40° Centigrade. With the slurry suitably agitated and homogenized within the container 38, the slurry pump 36 and the compressed gas pressure regulating valve 48 were set to feed the slurry through the atomizing nozzle 32 at a rate of substantially 10 grams per minute.

Figure 2:
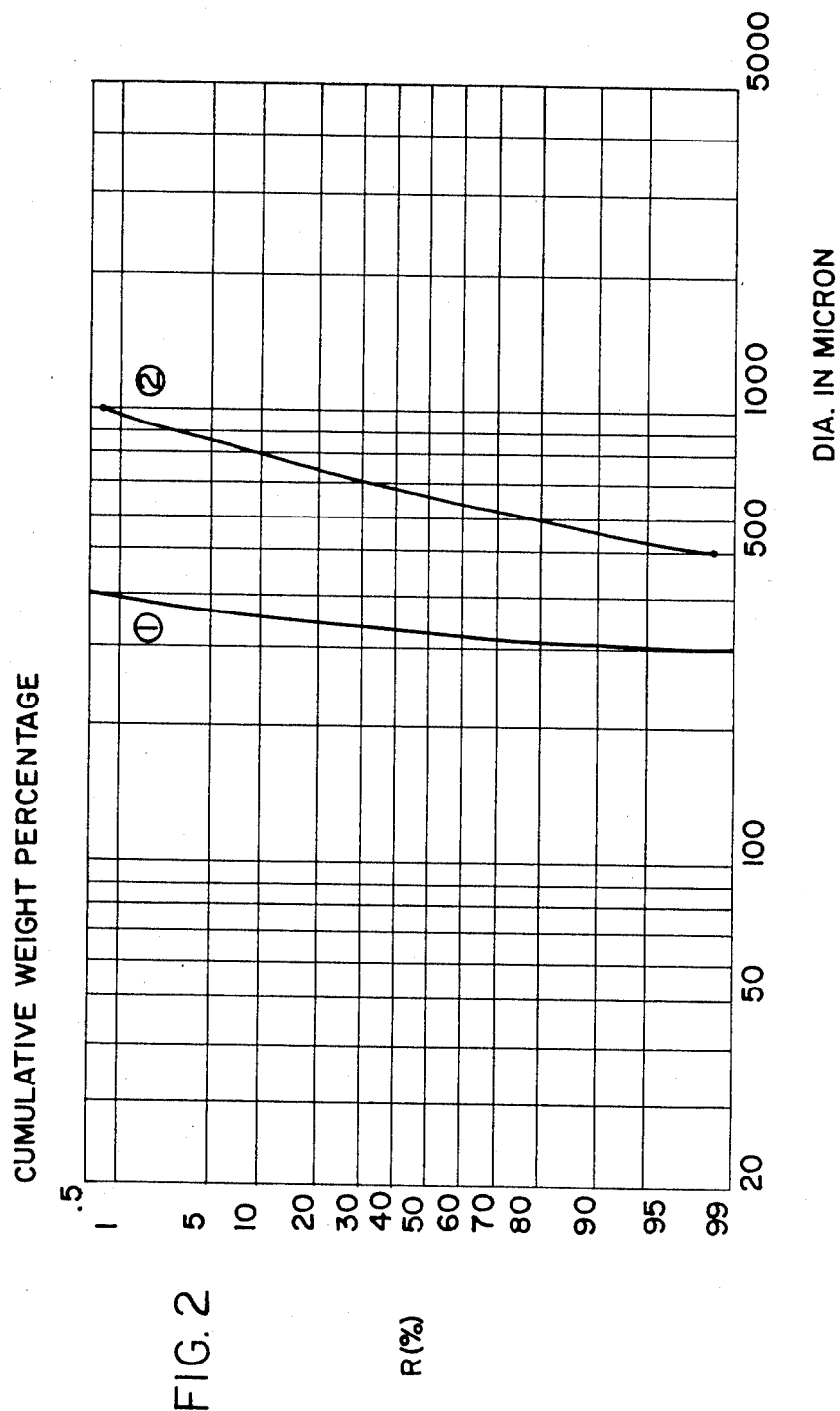
FIG. 2 is a graphical comparison of the size distribution of the initial abrasive grains utilized in performing the present method and the size distribution of the coated granules produced according to the present method.

After the coating and granulating operation had continued according to these parameters for 50 minutes, the granules produced within the fluid bed granulating apparatus 10 were discharged and weighed a total of 220 grams. The density of the coating granules was measured to be generally uniform within the range of approximately 2.8 to 3.0 grams per cubic centimeter. At the same time, the mesh size of the granules was also measured and found to range between approximately 500 and 1,000 micrometers in diameter, which conforms substantially to the range of mesh sizes of the original charge of synthetic diamond grains, as graphically illustrated in FIG. 2 in which line 1 represents a plotting of the size distribution of the diameters in micrometers of the original grain charge and line 2 represents a plotting of the size distribution of the diameters in micrometers of the coated granules.

According to conventional practice, the abrasive grit concentration normally desired for a typical metal-bonded diamond cutting saw blade is approximately 20 which, as those persons skilled in the art will recognize, would require cobalt powder of a weight approximately 48 times that of the abrasive grains so that a starting weight of 50 grams of abrasive synthetic diamond grains must be processed to a total granular weight of 2,450 grams. Accordingly, the coated granules produced after 50 minutes of processing in the above-described example must, of course, be subjected to further coating and granulating processing for use in the manufacture of metal-bonded diamond tools. In the described example, a total of 14 hours of coating and granulating operation of the fluidized bed granulating apparatus 10 was required to complete the granulation of the initial charge of 50 grams of synthetic diamond abrasive grains to a grain-to-metal concentration of 20 and, as will be recognized, the aforedescribed procedure of discharging, screening and re-charging the coated granules was performed in the course of the coating and granulating operation. As will be understood, the total required granulation time may be significantly shortened by increasing the slurry feed rate. For example, at a slurry feed rate of approximately 30 grams per minute, a total granulation time of about 5 hours would be expected. At the completion of the processing as described, 200 of the resultant granules were individually broken and examined and it was thereby found that 97% of the granules contained only a single abrasive grain.

The advantages of the method of the present invention will thus be readily recognized. In contrast to conventional procedures for metal coating of abrasive grains, the present method reliably and repeatably produces granules of a highly uniform spherical shape and size with minimal grain segregation so that substantially all of the granules contain only a single abrasive grain. As a result, the granules have excellent flowability characteristics which make the granules particularly suitable for automated handling and feeding such as in automated press-molding operations. The composition of the slurry with minimal amounts of the agglomerating binder insures a high grain retaining strength of the bond between the abrasive grains and the metal powder and, in turn, minimizes the occurrence of metal cracking and grain segregation during pressing and sintering operations using the granules, thereby insuring a correspondingly high grade of final product produced from the granules. The granules produced by the present method also minimize the risk of damage to pressing dies and other metal fabrication equipment, since each granule has a substantially uniform metal powder coating about the abrasive grains. In further contrast to conventional granulation methods, the present invention readily enables selective variation and tailoring of the size and other physical characteristics of the granules produced merely by varying the length of time of the coating and granulating operation, the metal powder concentration in the slurry, the slurry feed rate, and/or the temperature of the fluidizing gas flow, whereby the diameter and resultant grit concentration, the adhesive strength, the moisture content, and other characteristics of the granules may be selectively controlled.

It will therefore be readily understood by those persons skilled in the art that the present invention is susceptible of a broad utility and application. Many embodiments and adaptations of the present invention other than those herein described, as well as many variations, modifications and equivalent arrangements will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiment, adaptations, variations, modifications and equivalent arrangements, the present invention being limited only by the claims appended hereto and the equivalents thereof.

I claim:

1. A method of forming granules of abrasive grain coated with a metallic material in powder form suitable for use in a press-molding operation, said method comprising the steps of:
   (a) preparing a slurry of said metallic powder and a binding agent dissolved in an organic solvent,
   (b) fluidizing a quantity of said abrasive grain cores in a work vessel, and
   (c) spraying said slurry into said vessel onto said abrasive grain cores during said fluidizing thereof for building and drying a generally uniform coating of said slurry on each said abrasive grain core.

2. A method of forming granules according to claim 1 and characterized further in that said abrasive grain cores are diamond, synthetic diamond, or cubic boron nitride grains, and are of a generally uniform mesh size in the range of approximately 200 U.S. Mesh to 8 U.S. Mesh.

3. A method of forming granules according to claim 2 and characterized further in that said abrasive grain cores consist of synthetic diamond grains.

4. A method of forming granules according to claim 1 and characterized further in that said metallic powder is cobalt, copper, iron, bronze, tungsten carbide or a mixture of two or more thereof, and is of a generally uniform particulate size in the range of approximately 0.5 to 20 micrometers.

5. A method of forming granules according to claim 4 and characterized further in that said metallic powder consists of cobalt.

6. A method of forming granules according to claim 1 and characterized further in that said binding agent is polyethylene glycol, liquid paraffin, or glycerol.

7. A method of forming granules according to claim 1 and characterized further in that said organic solvent is ethyl alcohol or trichloro-ethylene.

8. A method of forming granules according to claim 1 and characterized further in that said metallic powder comprises no greater than approximately fifty percent (50%) by weight of said slurry and said binder comprises no greater than approximately three percent (3%) of the weight of said metallic powder.

9. A method of forming granules according to claim 1 and characterized further in that said abrasive grain cores are of a generally uniform mesh size and said spraying is continued for sufficient time to build said coating on each abrasive grain core to a sufficient diametric dimension to achieve a total weight of the coated granules approximating a value representing the desired granule concentration.

10. A method of forming granules according to claim 1 and characterized further by at least intermittently agitating said slurry to suspend said metallic powder generally uniformly therein.

11. A method of forming granules according to claim 1 and characterized further by circulating said abrasive grain cores within said work vessel during said fluidizing of said abrasive grain cores.

12. A method of forming granules according to claim 1 and characterized further in that said spraying said slurry includes providing a two-fluid atomizing nozzle and pumping said slurry through said nozzle while simultaneously applying a compressed gas through said nozzle to atomize said slurry.

13. A method of forming granules of abrasive grain cores coated with a metallic material in powder form, suitable for use in a press-molding operation for manufacturing metal-bonded diamond tools, said method comprising the steps of:
   (a) providing a fluidized bed granulating apparatus having a material work area and means for conveying a gaseous fluid through said work area for fluidized circulation of charge material within said work area,
   (b) preparing a slurry of said metallic powder and a selected binding agent dissolved in an organic solvent in predetermined relative concentrations, and at least intermittently agitating said slurry for generally uniform suspension of said metallic powder with said binding agent and said organic solvent,
   (c) charging said work area of said fluidized bed granulating apparatus with a quantity of said abrasive grain cores having a substantially uniform mesh size and operating said fluidized bed granulating apparatus for generally individual fluidization of said abrasive grain cores, and
   (d) spraying said slurry into said work area onto said abrasive grain cores during said fluidization thereof for progressively building and drying a generally uniform coating of said slurry on each said abrasive grain core.

14. A method of forming granules according to claim 13 and characterized further in that said metallic powder comprises no greater than approximately fifty percent (50%) by weight of said slurry and said binder comprises no greater than approximately three percent (3%) of the weight of said metallic powder.

15. A method of forming granules according to claim 13 and characterized further in that said abrasive grain cores are of a generally uniform mesh size and said spraying is continued for sufficient time to build said coating on each abrasive grain core to a sufficient diametric dimension to achieve a total weight of the coated granules approximating a value representing the desired granule concentration.

16. A method of forming granules according to claim 13 and characterized further by providing said fluidized bed granulator with a perforated plate rotatably disposed therein immediately beneath said material work area and rotating said plate for circulating said abrasive grain cores during fluidization thereof.

17. A method of forming granules according to claim 13 and characterized further in that said spraying said slurry includes providing a two-fluid atomizing nozzle and pumping said slurry through said nozzle while simultaneously applying a compressed gas through said nozzle to atomize said slurry.

18. A method of forming granules according to claim 13 and characterized further in that said binder is polyethylene glycol, liquid paraffin or glycerol, and said organic solvent is ethyl alcohol or trichloro-ethylene.

* * * * *